R. R. PROCTOR ET AL 3,447,753

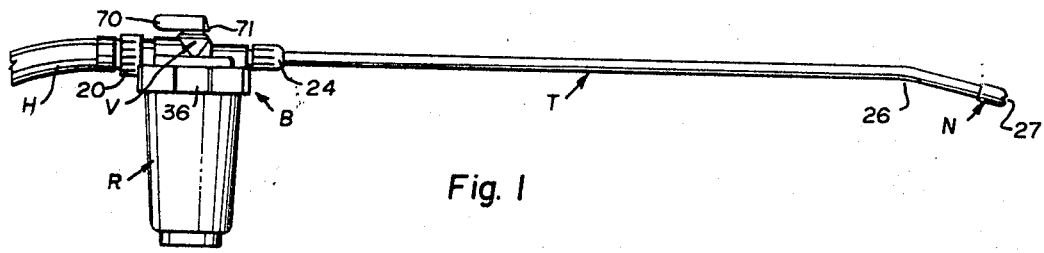
Fig. 1
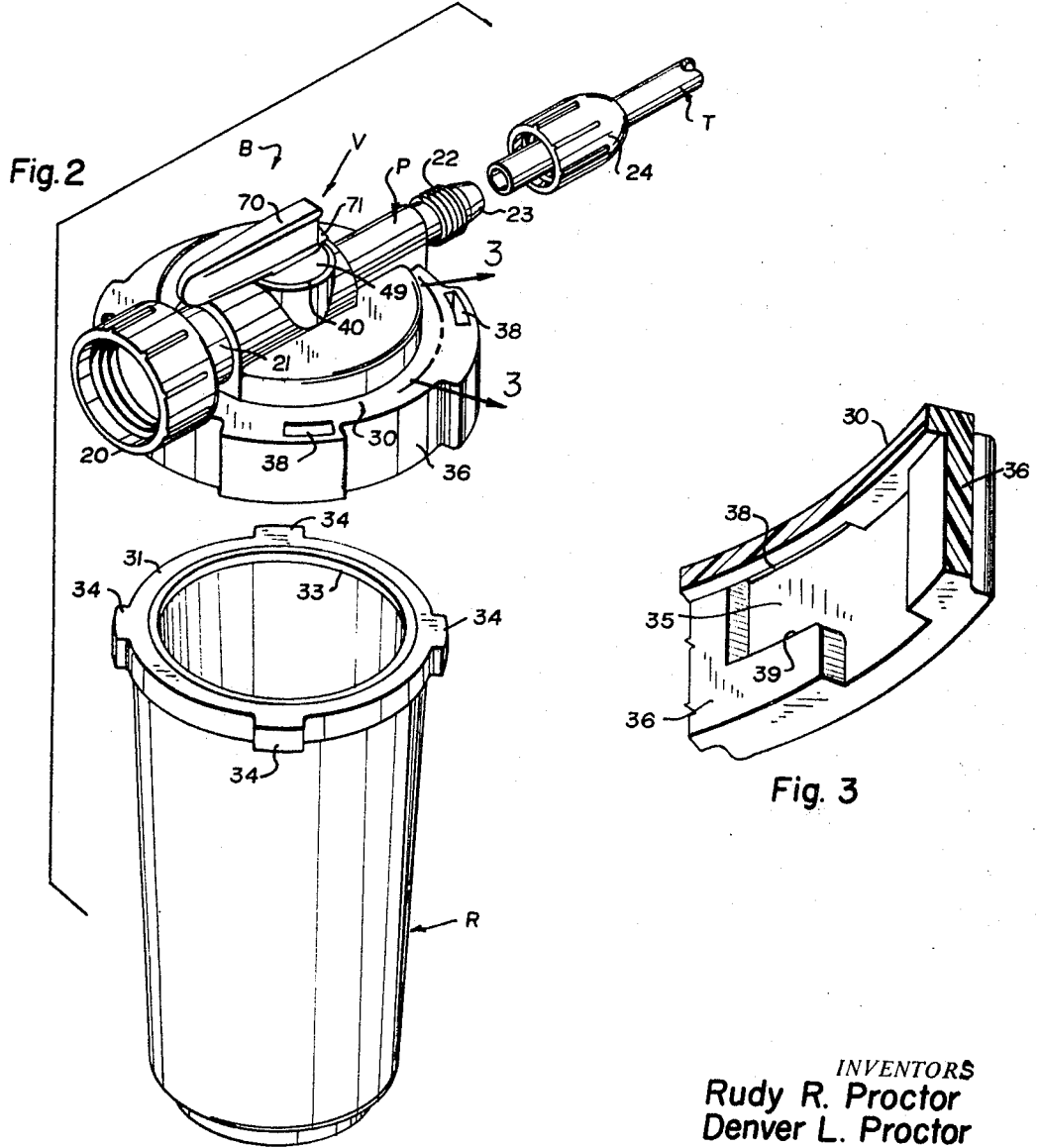
Fig. 2
Fig. 3
INVENTORS
Rudy R. Proctor
Denver L. Proctor
BY *Van Valkenburgh & Lowe*
ATTORNEYS June 3, 1969

SPRAY WASHER WITH DETERGENT FEED

Filed Jan. 27, 1967

INVENTORS
Rudy R. Proctor
Denver L. Proctor
BY Van Valkenburgh & Lowe

ATTORNEYS

United States Patent Office 3,447,753
Patented June 3, 1969

3,447,753
SPRAY WASHER WITH DETERGENT FEED
Rudy R. Proctor, Lakewood, and Denver L. Proctor, Denver, Colo., assignors to Jet-X Corporation, Denver, Colo., a corporation of Colorado
Filed Jan. 27, 1967, Ser. No. 612,184
Int. Cl. B05b 7/28
U.S. Cl. 239—317                                7 Claims

ABSTRACT OF THE DISCLOSURE

A spray washer connectable to a hose and including a body having a compound, three-position valve controlling both a primary passageway and an auxiliary passageway. An extension tube attached to the body forms a continuation of the primary passageway and terminates in a spray nozzle. The auxiliary passageway, shunting the primary passageway, includes a detergent reservoir mounted on the underside of the body. The valve, operable by a finger lever, may be shifted from an "off" position where the passageways are closed, to a "rinse" position where only the primary passageway is open, and alternately to a "soap" position where both the primary and auxiliary passageways are open. When at the "soap" position, a small flow through the auxiliary passageway agitates and stirs the detergent solution and forces detergent solution into the primary passageway. The valve has a rotatable stem extending into a body socket and includes a spherical plug in the primary passageway and a control disc on the underside of the body. Intake and outlet orifices form the auxiliary passageway and extend from the primary passageway to the reservoir, while this disc has ports which register with these orifices when the valve is rotated to the "soap" position. Another port registers with the downstream orifice when the valve is at the "off" position, to relieve pressure within the reservoir. A simple arrangement of O-ring seals eliminates leakage about the several movable parts of this valve structure. The detergent reservoir has ears which engage, from the underside, bayonet slots in a body rim formed during molding by abutting lugs of the male and female dies.

This invention relates to spray washers of the general type which are attached to a water hose or the like, and more particularly to spray washers which include facilities for optionally adding liquid detergents or soap to the water. Accordingly, the invention will be called a "spray washer with detergent feed" and, for simplicity, will be herein referred to as a "washer."

An object of the invention is to provide a novel and improved washer adapted to selectively spray soapy water for washing and clear water for rinsing by a simple manipulation of a control valve.

Another object of the invention is to overcome the difficulty in previous types of spray washers, wherein suction is utilized to pull a soap solution into the water stream, but back pressure, such as produced by a nozzle on the end of the discharge line, tends to reduce or even destroy the suction effect.

Another object of the invention is to provide a washer which may be equipped with a spray nozzle at the end of a discharge tube, but in which back pressure produced by the spray nozzle does not adversely affect the feed of a soap or detergent solution.

Another object of the invention is to provide, in a washer, a novel and simple auxiliary passageway shunting a primary water passageway, to provide flow into a reservoir containing a liquid detergent which will stir and agitate the detergent solution and to discharge the detergent solution into the water stream flowing through the primary passageway.

Another object of the invention is to provide a novel and improved washer adapted to feed a small stream of detergent solution from a reservoir into the water stream flowing through the washer, and through an auxiliary passageway shunting the main passageway of the washer, wherein a varying pressure gradient through the main passageway produces a positive pressure flow of detergent solution through the auxiliary passageway.

Another object of the invention is to provide in a washer, having a primary passageway and an auxiliary passageway shunting the primary passageway, a novel and improved compound valve for controlling the flow, selectively, through the primary passageway only, through the primary and auxiliary passageways, or to terminate flow.

Another object of the invention is to provide a washer which includes a body having a primary passageway and a detergent solution reservoir readily attached to and detached from the body, particularly wherein the construction of the body is such as to facilitate molding, installation of parts and production of seals at valve control parts.

Further objects of the invention are to provide a novel and improved spray washer with an optional detergent feed which is a sturdy, compact, neat appearing, low cost unit.

With the foregoing and other objects in view, all of which more fully hereinafter appear, our invention comprises certain constructions, combinations and arrangements of parts and elements, as hereinafter described and illustrated, in preferred embodiment, in the accompanying drawings, in which:

FIG. 1 is a side elevational view of the improved washer connected to the end of a water hose and ready for use;

FIG. 2 is an isometric, exploded view of the basic subassemblies of the washer, including a body, a detergent reservoir and an elongated discharge tube, which are often disconnected from each other, as when the washer is being refilled with a detergent, or is being cleaned or packaged for storage;

FIG. 3 is a fragmentary, sectional, perspective detail of a body portion illustrating a bayonet slot and its production, as taken substantially from the indicated arcuate line 3—3 of FIG. 2, but on an enlarged scale;

Figure 4:
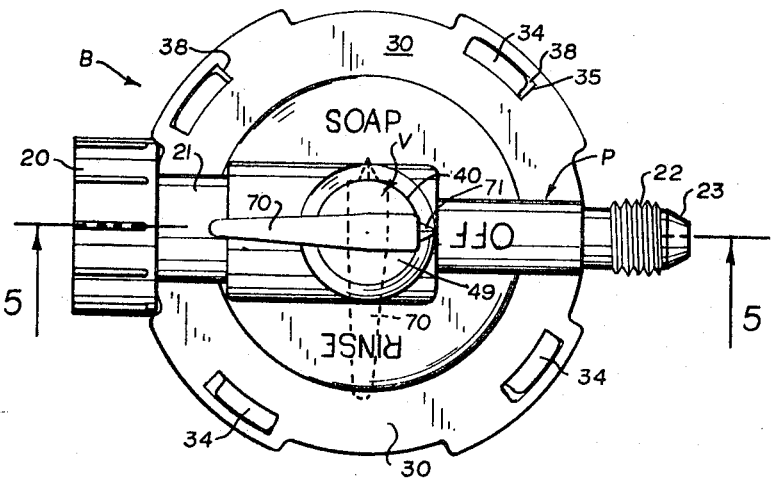
FIG. 4 is a top plan view of the body of the washer, illustrating the control lever at an "off" position and illustrating further, in broken lines, the position the lever will assume when detergent liquid is forced into the water stream of the sprayer.

Referring more particularly to the drawings, the improvide washer, as in FIGS. 1 and 2, is adapted to be attached to the discharge end of a common garden hose H which provides a flow of water under pressure through the apparatus. The standard male fitting of the hose is connected to the body B of the washer, a disc-like structure carrying a valve V and to the underside of which a soap or detergent solution reservoir R is detachably connected. The hose is connected to a threaded socket 20 of a short hose connector stub 21 at the intake end of the body primary passageway P of FIG. 5. Body B, valve V and reservoir R may be formed of any suitable material, but preferably of a rigid thermoplastic resin, such as high impact polystyrene, which is especially easy to form by injection molding or other suitable process. Stub 21 is conveniently molded as a separate part, as in FIG. 5, because of the internal threads of socket 20, then attached by a suitable cement to body B.

The discharge end of the passageway P terminates as an externally threaded stub 22 formed similar to the male end of a standard, flared tube fitting, terminating as a sloping chamfer 23. This stub is adapted to receive a socketed, internally threaded nut 24, as in FIG. 5, formed similar to a flared tube nut having a slope 25 at the bottom of the threaded socket adapted to contact and squeeze the stub chamfer 23. The discharge end of the passageway P is sized to snugly receive the end of an extension tube T which, when fitted therein, may be snugly held in place by tightening the nut 24 against the flare 23. The tube T, of thin walled brass or any other suitable material, may be of any suitable length, turned at the discharge end as at 26, or otherwise as desired, and terminating at a nozzle N. The nozzle N has a suitable slotted orifice 27 to produce a fan-like spray jet of water flowing from it.

The body B carries a disc-shaped flange 30 at its underside, forming a lid for detergent reservoir R, which is adapted to be attached to the lid to depend therefrom. The reservoir may be attached to the lid in any conventional manner which assures easy disconnection, as for refilling, and a leakproof fit when connected to the lid. The reservoir R, a wide mouth, jar-like unit, is formed of a rigid resin material similar to the body with an enlarged rim 31 having an internally rabbeted shoulder 32, as in FIG. 5, to receive and hold an internal seal ring 33 of rubber or like material. Four lugs 34 outstand from rim 31 for connection to bayonet slots 35 in the depending flange 36 of the lid 30. Sealing is effected when the reservoir R is fastened to the lid 30 by contact of the seal ring 33 with an annular lip 37 depending from the underside of the lid concentric to and within the embrace of the flange 31, lip 37 being chamfered on the outside to wedge against seal ring 33. The outside chamfer or taper of lip 37 causes seal ring 33 to be wedged upwardly against lip 37 by the pressure within reservoir R, so that the higher the pressure, the tighter the seal.

The bayonet slots 35 are formed as continuous, offset, slot-like spaces at the inner face of the lid flange 36, as illustrated in FIG. 3, and at the selected quadrant spacing about the lid 30 which straddle the centerlines of the longitudinal and transverse axes of the body for clearance purposes. The bayonet slots 35 continue to the top surface of the body lid as slots 38, in the manner illustrated in FIGS. 3 and 4. This unique construction permits injection mold forming of the bayonet slots 35 by the use of circumferentially offset, abutting lugs of both the male and female dies of the body mold, the inner ends of the lugs which form slots 38 being placed to form shoulders 39 of the bayonet slots.

The stem of a compound valve V is mounted in opposed circular sockets 40 and 41 centered on the common axis of the lid 30 and reservoir R and disposed above and below, respectively, the centerline of passageway P. The stem of valve V commences at the top of the body to cross the passageway P, extend through the floor thereof and project from the underside of the lid 30. This is a compound valve functioning to open and close the primary passageway P and also to open and close an auxiliary passageway shunting the primary passageway and extending through the reservoir R, as hereinafter further described.

Figure 5:
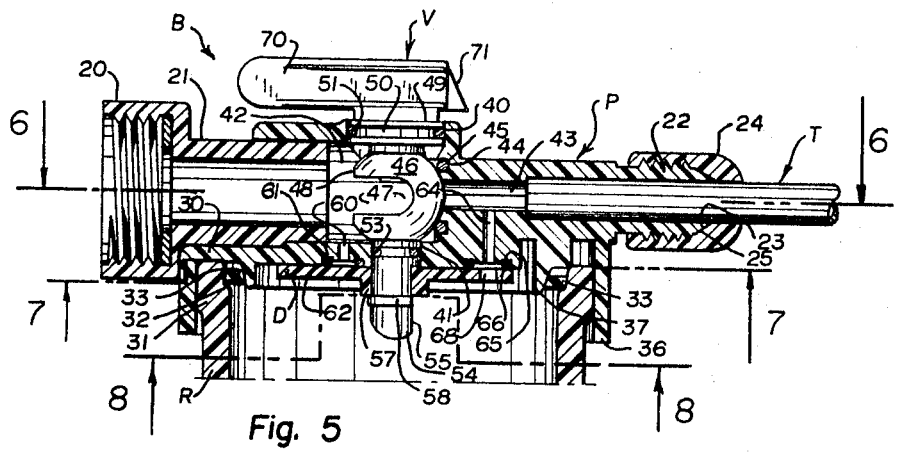
FIG. 5 is a longitudinal, sectional detail through the body of the apparatus, as taken from the indicated line 5—5 of FIG. 4.
Figure 6:
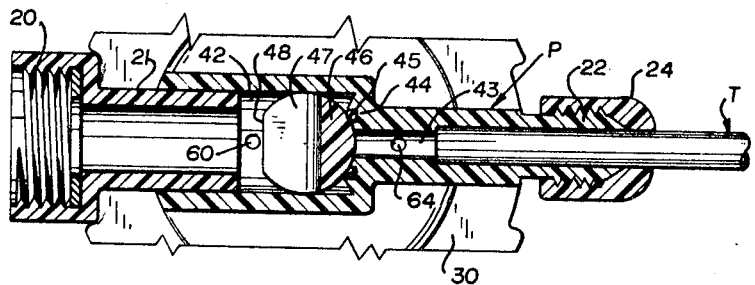
FIG. 6 is a fragmentary, longitudinal sectional detail, as taken from the indicated line 6—6 of FIG. 5, but broken away at each side to conserve space.

The passageway P through the body B is enlarged at its upstream end 42, where it receives the tubular hose connector stub 21, which enlarged portion extends to the opposite side of valve V. Where an ordinary garden hose is to be used, a convenient inside diameter for this enlarged portion of passageway P is approximately ¾ inch. The diameter of the passageway P abruptly decreases, as to approximately ¼ inch, at the downstream section 43, i.e. downstream from the valve V. This decrease in diameter forms a circular wall in which is formed a groove 44 adapted to hold an O-ring seal 45 at the downstream side of the valve. The valve stem is enlarged in this passageway to form a sphere 46 which seats against the O-ring 45 at all rotative positions of the stem, as in FIGS. 5 and 6. This sphere has a centered passageway 47, as in FIG. 9, which is open at one side for convenience in molding, the side opening thereof facing upstream and opposite the O-ring seal 45 when the valve is closed, as illustrated in FIG. 5. The valve stem may be rotated 90 degrees from this closed position, in either direction, to align the passageway 47 with the body passageway P, i.e. to an open position. As a further feature, one side of this sphere, such as at the edges of passageway 47, is flattened as at 48, as in FIGS. 5, 6 and 9, so that when the stem is rotated 180 degrees from the closed position of FIG. 5, the flat 48 opposes O-ring 45 but clears the same, to permit the valve stem to be withdrawn from or placed in the body, as during assembly or disassembly of the unit.

The socket 40 above the upstream passageway 42 is formed as a smooth walled, cylindrical surface and the top portion of the valve stem, at this surface, is enlarged as a disc 49, fitting into the opening. The disc 49 has a circumferential groove 50, as in FIGS. 5 and 9, to retain an O-ring 51 for a leakproof fit against the surface of socket 40. Socket 41, at the floor of the passageway P, is reduced in diameter from socket 40 and is formed as a smooth walled, cylindrical bore extending to the underside of body B. The portion of the stem of valve V just below sphere 46 is sized to fit the bore of socket 41 and has a groove 52 which carries an O-ring 53, to effect a leakproof fit in the bore.

Figure 9:
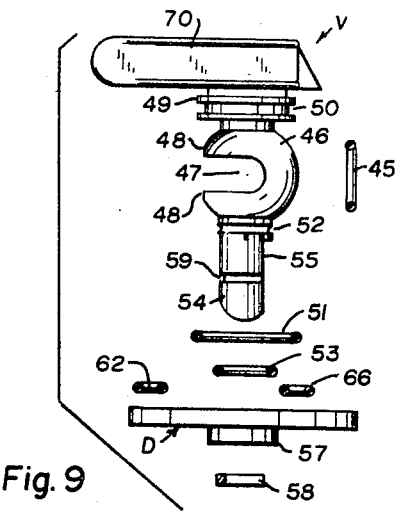
FIG. 9 is an exploded view of the components forming the control valve within the body of the unit.
Figure 7:
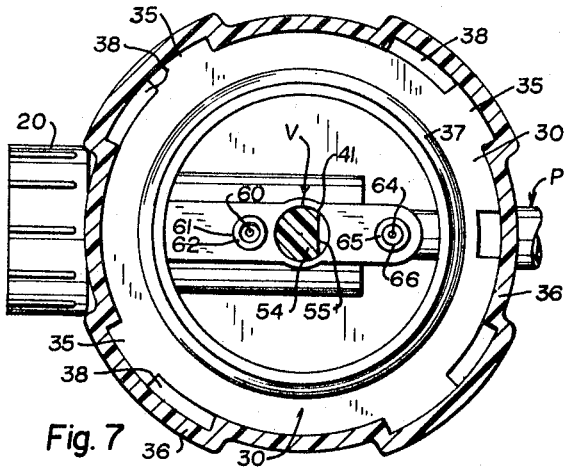
FIG. 7 is a bottom, sectional view, as taken from the indicated line 7—7 of FIG. 5.
Figure 8:
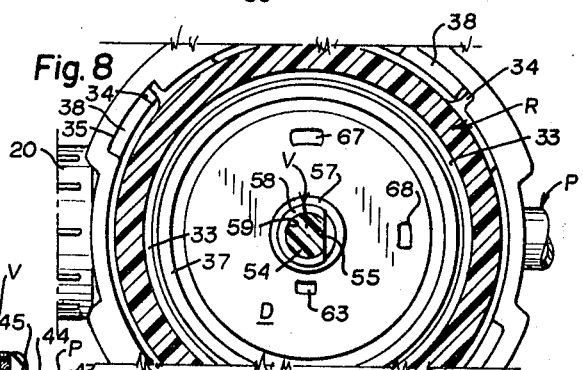
FIG. 8 is a bottom, sectional view, as taken from the indicated line 8—8 of FIG. 5, but with a portion on each side being broken away to conserve space.

The portion 54 of the valve stem which projects below socket 41 is cylindrical in section, as in FIGS. 7–9, but has one flattened face 55, to fit a central hole in a disc D formed in a like manner, i.e. cylindrical with one flattened face. Disc D may be molded from the same material as body B and valve V and is provided with a central depending tubular hub 57, as in FIG. 9, for a purpose described below. The disc D fitted upon the stem rotates with the stem of valve V and is located at a selected circumferential position on the stem, which is established by the meshing of the flat face 55 with the corresponding face in the disc hole. The disc is locked vertically onto the valve stem by a split lock ring 58 which abuts disc stem 57 and fits into a groove 59 near the bottom of the valve stem. This locking ring 58 holds the disc D snugly against the undersurface of the body B, the diameter of the disc being such that it fits within the circular lip 37 on the underside of the body lid.

The disc D rotates with rotation of the valve V to provide control for a secondary or auxiliary passageway which shunts the passageway P. This auxiliary passageway includes an orifice 60 extending through the bottom of the upstream portion 42 of the passageway P and to the underside of the body, to direct water into the reservoir R from a point upstream from the valve V. In both rinse and off positions of the valve, this orifice is blocked by the disc D. A groove 61 surrounding orifice 60, at the underside as in FIG. 7, receives a small O-ring 62 which bears against the top side of the disc D, as in FIG. 10, to seal the passageway at the orifice 60. To open the orifice 60 to the reservoir, the disc D includes a port 63 which registers with the orifice 60, when the disc is rotated to a "soap" position, as in FIG. 10, and as hereinafter described. Port 63 is conveniently circumferentially elongated, so as to register with hole 60 in the event the valve is turned to a slightly off center position.

The auxiliary passageway includes a second orifice 64 at the downstream side of the valve V, extending through the bottom of the downstream end 43 of passageway P and communicating, at certain times, with the reservoir chamber at a point downstream from the valve, but at a point spaced further from the center of disc D than orifice 60. However, the bottom of this orifice 64 is also normally blocked by the disc D. A groove 65 surrounds this orifice at the underside of the body, as in FIG. 7, to receive a small O-ring 66, which bears against the top side of the disc to seal the passageway at the exit of the orifice 64. To open orifice 64 to the reservoir, the disc D includes a flow port 67 and a relief port 68, as in FIG. 8, each circumferentially elongated for the purpose described above. The flow port 67 registers with the orifice 64 when the disc is rotated to a "soap" position, i.e. when the port 63 registers with the orifice 60, ports 63 and 67 being diametrically opposite to each other, whereby a continuous flow through the auxiliary passage may be effected, as illustrated in FIG. 10.

The relief port 68 of disc D is spaced 90 degrees from port 67 and is adapted to register with the downstream orifice 64 when the valve is turned to an "off" position, as illustrated in FIG. 5. This maintains atmospheric pressure within the reservoir when the apparatus is not in use, as well as relieving any pressure in reservoir R when the reservoir is to be detached, as for replenishment of detergent or a soap solution. It is to be noted that the orifices 60 and 64 are located at different radial distances with respect to the axis of the disc, the orifice 60 being closer so that the ports 67 and 68 will not register with orifice 60, nor will the port 63 register with the orfice 64, when the valve is rotated to the "off" position.

Valve V is provided at its upper end with a handle 70 extending to one side and a pointer 71 at the opposite side. The handle 70 and pointer 71 are correlated with the ports 63, 67 and 68 in disc D and markings are conveniently placed on top of the body to indicate "off," "soap" and "rinse" positions, as in the manner illustrated in FIG. 4. Thus, when the pointer 71 is at the "off" position, as illustrated in FIG. 4, the relief port 68 registers with orifice 64, as shown in FIG. 5. When the pointer 71 is rotated 90 degrees counterclockwise to the "off" position, as indicated in broken lines in FIG. 4, i.e. to the "soap" position, the ports 63 and 67 register with the respective orifices 60 and 64 and the auxiliary flow passageway is open, as shown in FIG. 10. When rotated to the "rinse" position, i.e. 90 degrees clockwise from the "off" position, the auxiliary passageway is closed, since each of O-rings 62 and 66 then bear against an imperforate area of disc D, thereby permitting only a flow of clear water through passageway P.

Figure 10:
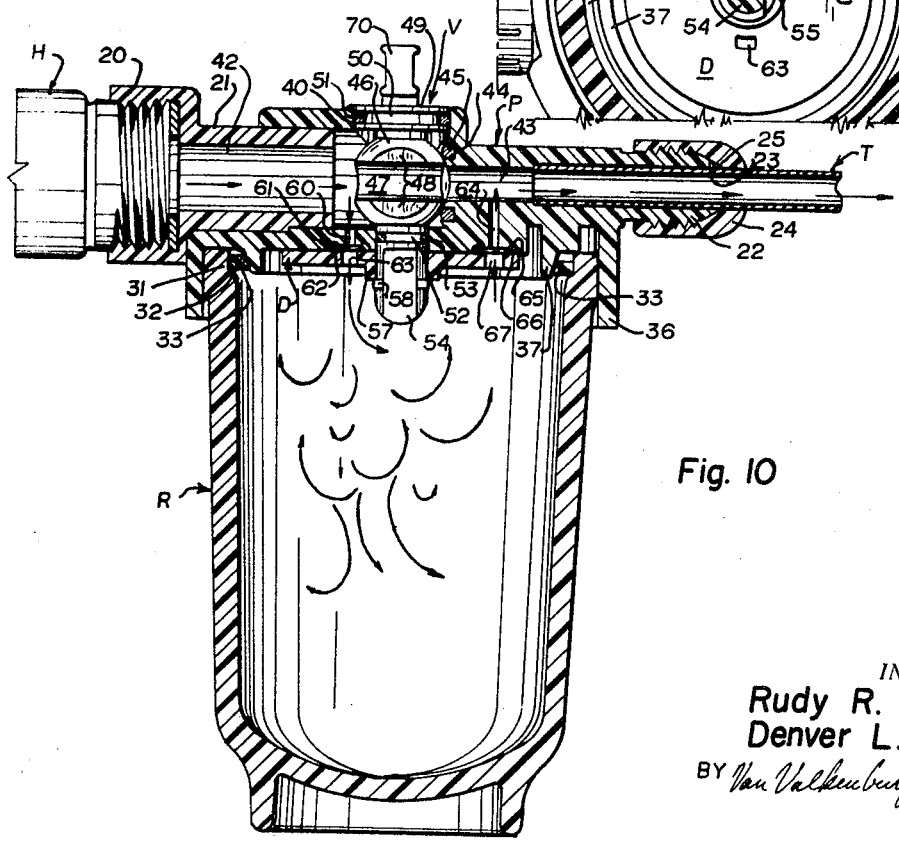
FIG. 10 is a longitudinal, sectional view, similar to FIG. 5, but including the reservoir, the view showing the valve being turned to the "soap" position of FIG. 4 and arrows to indicate the mixing action of water flowing into the reservoir.

When the valve is turned to the "soap" position, the pressure in upstream passageway section 42 is effective to cause a stream of water to flow through the orifice 60 with sufficient velocity to form a jet which is directed into the reservoir and will stir a detergent or soap solution therein, as indicated by the arrows of FIG. 10, within the reservoir, and discharge the mixed solution from the reservoir through the orifice 64 and into the passageway downstream section 43. The passageway P is formed to effect this desired pressure gradient to force a flow through the auxiliary passageway. The enlarged portion 42 of the passageway upstream from the valve, at the orifice 60, will produce a condition of a minimum velocity and maximum pressure, while the smaller diameter of the passageway section 43 downstream from the valve, at the orifice 64, produces a maximum velocity head and a minimum pressure. The definite change in the size of the passageway at the upstream and downstream sides of the valve produces a definite pressure differential at the orifices 60 and 64, even when the orifice 27 of the nozzle N is restricted to effect a spray and produce a back pressure in the line. Accordingly, the entire system, through the primary passageway and through the auxiliary passageway, will be under pressure at all times but with a significant flow through the auxiliary passageway.

The use of the apparatus is quite simple. The washer may be used with or without soap, and whenever the reservoir becomes depleted, the reservoir may be disconnected from the body, filled with new solution, reconnected and operation continued. It is to be noted that the detergent or soap solution will be diluted by the stirring action of water flowing into the reservoir. However, actual use of the apparatus did not indicate that this was at all disadvantageous, and if anything, desirable, since the strongest detergent solution is usually required at the beginning of a washing operation. Particularly when a detergent is used, the detergent liquid may be sufficiently concentrated that a portion equal to only a fraction of the capacity of reservoir R, such as one-fifth to one-third, is necessary. When the reservoir is only partly filled with detergent, the outflowing liquid will not contain detergent until the reservoir is filled with liquid, but the detergent solution is well mixed by this time.

We have now described our invention in considerable detail. However, others skilled in the art can easily build other constructions which are nevertheless within the spirit and scope of our invention. Hence, we desire that our protection be limited not by the constructions illustrated and described, but only by the proper scope of the appended claims.

What is claimed is:

1. A spray washer comprising:
   (a) a body having a primary passageway through it, a lid on the underside of the body, means at the upstream end of the primary passageway for connection with a water supply line, a first orifice from the primary passageway to the underside of the lid at an upstream position and a second orifice from the primary passageway to the underside of the lid at a downstream position, the said first and second orifices forming portions of an auxiliary passageway shunting the primary passageway and the diameter of the primary passageway at the intake orifice being substantially larger than the diameter at the discharge orifice, whereby the fluid pressures established by flow in the primary passageway produce a positive pressure differential in the primary passageway at the orifices;
   (b) a detergent reservoir adapted to be connected to the underside of the lid and completing the auxiliary passageway; and
   (c) a compound valve having a first closure means at the primary passageway adapted to close the passage at a position between the orifices when the valve is moved to a first position and to open the passageway when the valve is moved to a second and a third position and a second closure means adapted to close the upstream orifice and open the downstream orifice when said valve is moved to the first position, to open both orifices when moved to the second position, and to close both orifices when moved to the third position.

2. A spray washer comprising:
   (a) a body having a primary passageway through it, a lid on the underside of the body, means at the upstream end of the primary passageway forr connection with a water supply line, a first orifice from the primary passageway to the underside of the lid at an upstream position and a second orifice from the primary passageway to the underside of the lid at a downstream position, the said first and second orifices forming portions of an auxiliary passageway shunting the primary passageway;

(b) a detergent reservoir adapted to be connected to the underside of the lid and completing the auxiliary passageway; and (c) a rotatable compound valve having a closure means at the primary passageway adapted to close the passage at a position between the orifices when the valve is moved to a first position and to open the passageway when the valve is moved to a second position and a second closure means controlling the flow through said auxiliary passageway; said closure means at the primary passageway including:

(d) a sphere having an opening therethrough;

(e) a circular seat about the passageway at the downstream side of said valve contacting the body of the sphere to thereby close the passageway when the sphere is rotated to place its opening transversely of the passage axis and to open the passageway when the opening is aligned with the axis; and (f) a flat on one side of said sphere to clear said seat when inserting or removing said valve.

3. A spray washer, as defined in claim 2, wherein said second closure means comprises:

a disc carried upon said valve at the underside of the lid and adapted to abut against the orifice exists; and ports through the disc adapted to register with the orifice exists when said valve is moved to said second position.

4. A spray washer, as defined in claim 3, wherein:

sealing rings surround said orifices on the underside of said body for engagement with said disc.

5. A spray washer, as set forth in claim 3, wherein:

said upstream orifice and downstream orifice are oriented 180 degrees apart with respect to the valve axis with one being positioned at a greater radial distance from the axis than the other; and said disc ports are correspondingly oriented, to prevent the ports normally opening the orifices at the said second position from opening the orifices when the disc is rotated 180 degrees with respect thereto.

6. A spray washer, as set forth in claim 5, including:

a port in the disc adapted to register with said downstream orifice when the stem is rotated to said first position, to relieve pressure within the reservoir.

7. A spray washer comprising:

(a) a body having a primary passageway through it, a lid on the underside of the body, means at the upstream end of the primary passageway for connection with a water supply line, a first orifice from the primary passageway to the underside of the lid at an upstream position and a second orifice from the primary passageway to the underside of the lid at a downstream position, the said first and second orifices forming portions of an auxiliary passageway shunting the primary passageway;

(b) a detergent reservoir adapted to be connected to the underside of the lid and completing the auxiliary passageway; and (c) a rotatable compound valve having a closure means at the primary passageway adapted to close the passage at a position between the orifices when the valve is moved to a first position and to open the passageway when the valve is moved to a second position and a second closure means controlling the flow through said auxiliary passageway; said second closure means including:

(d) a disc carried upon said valve at the underside of the lid and adapted to abut against the orifice exits, said upstream orifice and downstream orifice being oriented 180 degrees apart with respect to the valve axis with one being positioned at a greater radial distance from the axis than the other;

(e) ports through the disc adapted to register with the orifice exits when said valve is moved to said second position; and (f) said disc ports are correspondingly oriented, to prevent the ports normally opening the orifices at the said second position from opening the orifices when the disc is rotated 180 degrees with respect thereto.

References Cited

UNITED STATES PATENTS

| | | | |
|---|---|---|---|
| 2,058,901 | 10/1936 | McPherson | 239—310 |
| 2,562,415 | 7/1951 | Chase | 239—310 |
| 2,624,619 | 1/1953 | Fletcher et al. | 239—310 |
| 2,789,010 | 4/1957 | Dean | 239—310 |
| 3,254,844 | 6/1966 | Blasnik et al. | 239—318 |

EVERETT W. KIRBY, Primary Examiner.

U.S. Cl. X.R.

239—318